United States Patent [19]
de la Peña et al.

[11] Patent Number: 5,690,408
[45] Date of Patent: Nov. 25, 1997

[54] FIBER OPTIC BASED LIGHTING FOR AIRCRAFT

[75] Inventors: Alex T. de la Peña, San Diego; Carl A. Mentzer, Poway, both of Calif.

[73] Assignee: McDonnell Douglas Corporation, Huntington Beach, Calif.

[21] Appl. No.: 717,564

[22] Filed: Sep. 23, 1996

[51] Int. Cl.⁶ ............................................ B60Q 1/24
[52] U.S. Cl. .............................. 362/32; 362/62; 362/74
[58] Field of Search ........................ 362/32, 62, 293, 362/74, 80, 330, 328, 311; 385/147, 901, 115, 116, 32

[56] References Cited

U.S. PATENT DOCUMENTS

| | | |
|---|---|---|
| 3,723,722 | 3/1973 | Van Iderstine et al. . |
| 4,152,752 | 5/1979 | Niemi . |
| 4,234,907 | 11/1980 | Daniel ........................ 362/32 |
| 4,537,469 | 8/1985 | Kircher . |
| 4,597,033 | 6/1986 | Meggs et al. ............... 362/62 |
| 4,740,870 | 4/1988 | Moore et al. . |
| 4,811,172 | 3/1989 | Davenport et al. . |
| 4,887,190 | 12/1989 | Sadamune et al. ......... 362/32 |
| 4,958,263 | 9/1990 | Davenport et al. ......... 362/32 |
| 5,009,020 | 4/1991 | Watanabe ................... 362/32 |
| 5,321,586 | 6/1994 | Hege et al. . |
| 5,436,806 | 7/1995 | Kato ........................... 362/32 |
| 5,483,427 | 1/1996 | Dealey, Jr. et al. . |
| 5,568,964 | 10/1996 | Parker et al. ............... 362/32 |

*Primary Examiner*—Thomas M. Sember
*Attorney, Agent, or Firm*—Harness, Dickey & Pierce P.L.C.

[57] ABSTRACT

The present invention provides a lighting system including a centralized light source, a plurality of light emitters, and a plurality of fiber optic lines extending between the light source and the light emitters for delivering light therebetween. More particularly, the present invention includes a light source operably coupled to a concentrator for directing light generated by the light source towards an exit end of the concentrator. A fiber optic bundle is secured at its proximal end to the exit end of the concentrator for receiving the light generated by the light source therein. A plurality of subbundles diverge from the fiber optic bundle and transport the light from the light generator to a plurality of emitters. The emitters are disposed at various locations of desired illumination and emit the delivered light therefrom.

23 Claims, 2 Drawing Sheets

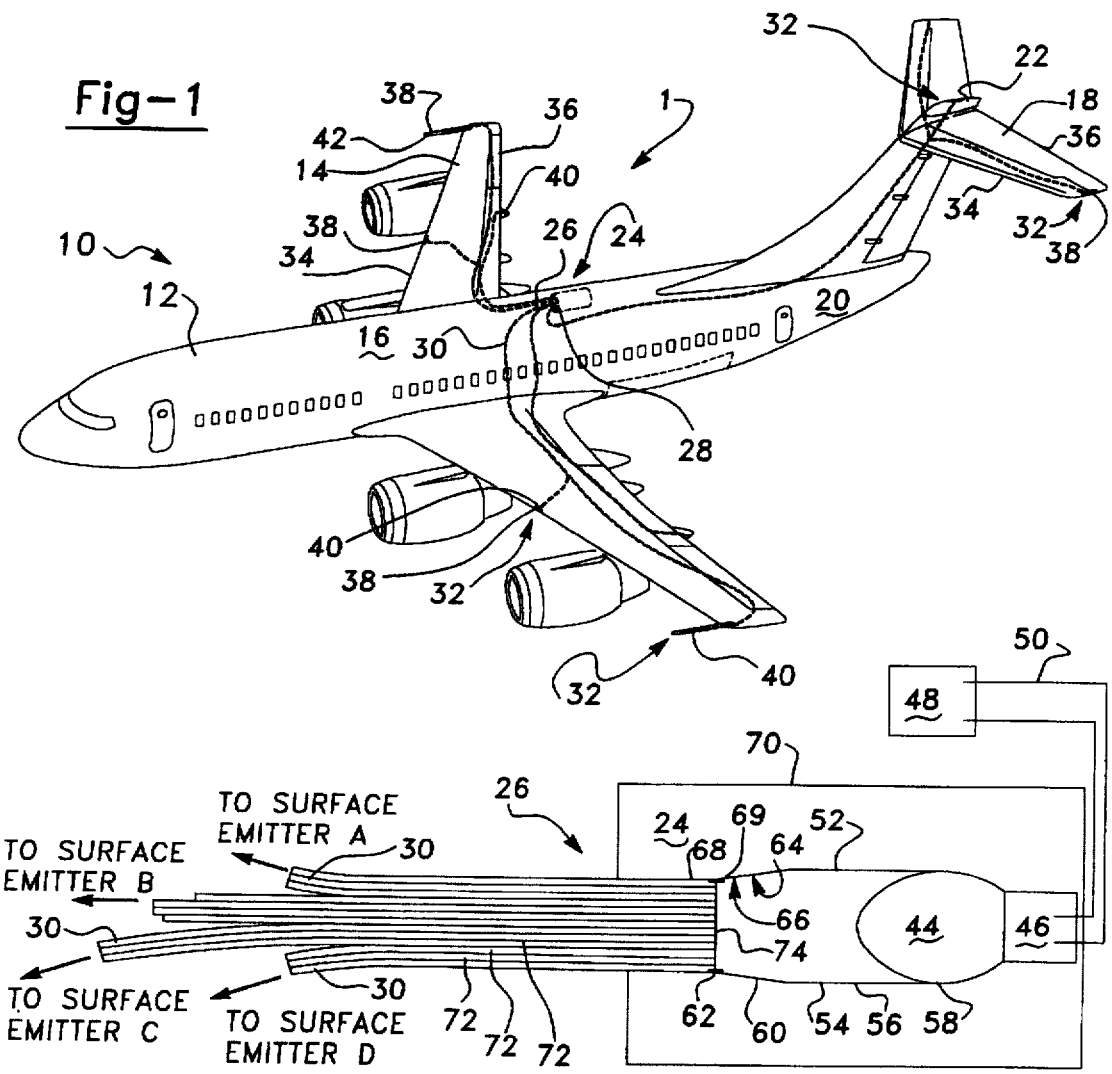
Fig-1
Fig-2
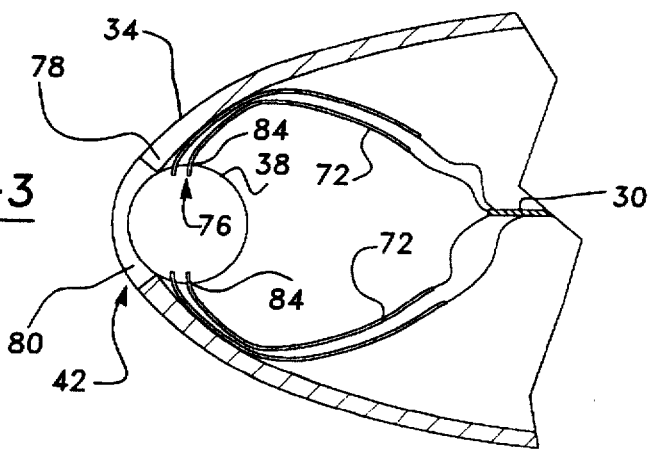
Fig-3

FIBER OPTIC BASED LIGHTING FOR AIRCRAFT

BACKGROUND OF THE INVENTION

1. Technical Field

This invention generally relates to a lighting system, and more particularly, to a lighting system comprised of a centralized light source and a plurality of light emitters operably coupled to the light source by a plurality of fiber optic fibers.

2. Discussion

It is generally known in the art of aircraft design that outboard directed illumination is desirable on remote perimeter locations such as the leading and trailing edges of aircraft appendages. For instance, an aircraft wing generally includes at least one light emitter disposed on a leading edge and at least one light emitter disposed on a trailing edge. Furthermore, the elevator and rudder of the aircraft generally include a light emitter disposed along the trailing edges thereof.

Aircraft wing tips and other leading and trailing edges experience high vibration when the aircraft is in flight. Conventionally, these remote areas are illuminated by filament-type light bulbs disposed at each lighting area. Therefore, a separate light bulb is required for each light output point. Also, dedicated wiring is required to electrically couple each light bulb to the aircraft's power and control system.

Conventional filament lamps frequently fail under such high vibration and require a high number of service hours to maintain. Vibration isolation has been incorporated at the light output points in an effort to reduce the number of filament lamp failures and maintenance hours. However, the vibration isolation requires additional man-hours to install, additional components to operate, and frequently fail to provide adequate vibration control. Also, the risk of fire is enhanced by the presence of substantial electrical wiring and hot filament-type lamps.

Therefore, it is desirable to provide a lighting system which eliminates filament-type light bulbs and decreases the required number of maintenance hours to service the system. It is also desirable to provide a lighting system which provides a large area of illumination and reduces the required electrical wiring to a set directed only to a centralized location. It is stir further desirable to provide a lighting system which provides reliable illumination in high-vibration locations.

SUMMARY OF THE INVENTION

The above and other objects are provided by a lighting system including a centralized light source, a plurality of light emitters, and a plurality of fiber optic lines extending between the light source and the light emitters for delivering light therebetween. More particularly, the present invention includes a light source operably coupled to a concentrator for directing light generated by the light source towards an exit end of the concentrator. A fiber optic bundle is secured at its proximal end to the exit end of the concentrator for receiving the light generated by the light source therein. A plurality of sub-bundles diverge from the emitters are disposed at various locations of desired illumination and emit the delivered light therefrom.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view of an aircraft having a fiber optic based lighting system according to the present invention disposed therein;

FIG. 2 is a schematic view of a centralized light source and a fiber optic bundle operably coupled thereto according to the present invention;

FIG. 3 is a cross-sectional view of an emitter and a plurality of individual optical fibers disposed within an aircraft structure according to the present invention.

DETAILED DESCRIPTION OF THE PREFERRED EMBODIMENTS

Figure 4:
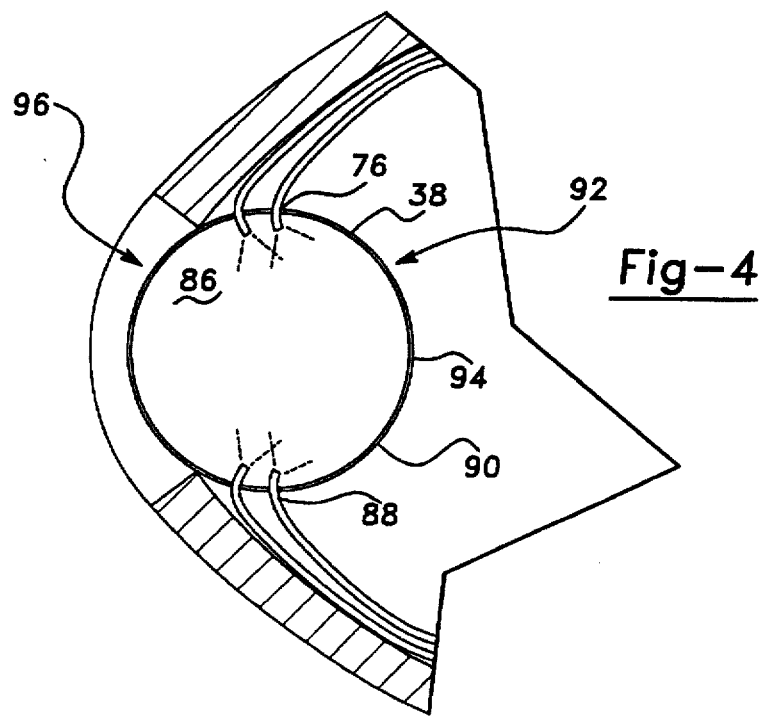
FIG. 4 is an enlarged cross-sectional view of the emitter and individual optical fiber disposed within an aircraft structure of FIG. 3.

Referring now to FIG. 1, a fiber optic based lighting system for an aircraft is shown generally at 1. Although this specification emphasizes aircraft lighting, it should be understood that the present invention is suitable for use in all systems requiring remote lighting such as surface ships, boats, patios and pools, as well as aircraft runways. As is generally known, remote lighting areas such as aircraft wing tips and other leading and trailing edges experience significant vibration in operation. Conventional filament-type light bulbs frequently fail under such vibration and often require vibration isolation and a significant number of maintenance hours. Furthermore, the wiring harness required for operating conventional bulbs is complex, bulky, and prone to failure. Additionally, the presence of multiple wiring harnesses and hot filament-type lamps increases the potential for short circuits and fires. The present invention eliminates the use of filament-type lamp bulbs at such remote locations and replaces them with a centralized light source and vibrationally stable light emitters coupled to the light source by fiber optics.

Still referring to FIG. 1, an aircraft 10 is shown including a body 12, a pair of laterally projecting wings 14 oppositely disposed at a central portion 16 of the body 12, and a pair of laterally projecting elevators 18 oppositely disposed at an aft portion 20 of the body 12. A rudder 22 vertically projects from the aft portion 20 of the aircraft body 12.

A centralized light source 24 is disposed within the interior section of the aircraft body 12. The centralized light source 24 may comprise a single or multiple light generators although in the preferred embodiment a single light generator is utilized. The light source 24 is operably coupled to a fiber optic bundle 26 which extends from a first end 28 of the light source 24 for delivering generated light to the fiber optic bundle 26.

A plurality of fiber optic sub-bundles 30 diverge from the fiber optic bundle 26 and extend to a plurality of locations 32 about the periphery of the aircraft 12. For instance, the plurality of fiber optic sub-bundles 30 extend toward the leading and trailing edges 34, 36 of the wings 14 and elevators 18.

A plurality of light emitters 38 are disposed at the leading and trailing edges 34, 36 of the wings 14 and elevators 18 and are operably coupled to a distal end 40 of the fiber optic sub-bundles 30. Accordingly, light generated from the light source 24 is delivered through the fiber optic bundle 26 and through fiber optic sub-bundles 30 to the light emitters 38. Preferably, the light emitters 38 project the light outboard of the aircraft 10. It should be noted that a filter 42 can be disposed over the light emitters 38 to provide different colors of light output.

Referring now to FIG. 2, the centralized light source 24 and fiber optic bundle 26 are shown in greater detail. The centralized light source 24 preferably includes a high-intensity halogen light source 44 secured to a coupler 46 which is operably connected to an aircraft power and control system 48 through electrical wires 50 or other conventional means. A concentrator 52 is secured to the high-intensity halogen light source 44 such that light generated therefrom is focused in a pre-determined direction.

The concentrator 52 includes a housing 54 including a generally cylindrical portion 56 coupled at a closed end 58 to the high-intensity halogen light source 44. A conical portion 60 of the housing 54 extends from the cylindrical portion 56 towards an exit end 62. An inner surface 64 of the concentrator 52 includes a reflective coating 66 disposed thereon. Preferably, the reflective coating 66 comprises a highly reflective metal or dielectric material.

The fiber optic bundle 26 is secured at a distal end 68 to the exit end 62 of the concentrator 52. To accomplish this, a sleeve 69 is interposed between the fiber optic bundle 26 at its distal end 68 and the concentrator 52 at its exit end 62. The diameter of the fiber optic bundle 26 is selected based on the desired fiber length and the output required.

The centralized light source 24 and fiber optic bundle 26 are encompassed by a compartment 70 adapted for thermal resistivity and structural stability for operation within the interior of the aircraft 10. Preferably, the compartment 70 adequately supports the centralized light source 24 and fiber optic bundle 26 such that the system 1 is resistant to flight turbulence, vibration, and thermal changes. The compartment 70 is secured to the body 12 of the aircraft 10 in a manner such that it is stable in flight.

The fiber optic bundle 26 includes a plurality of fiber optic sub-bundles 30 diverging therefrom which extend throughout the interior of the aircraft 10 to desired light output locations 32. The number of fiber optic sub-bundles 30 depends on the number of light output areas desired. Also, the fiber optic sub-bundles 30, and therefore the fiber optic bundle 26 as a whole, comprise a plurality of individual optical fibers 72. The number of individual fibers 72 in each sub-bundle 30 is based on light output requirements at each light output area 32.

Preferably, the individual optical fibers 72 include polished proximal and distal ends 74, 76 which allow high transmission of light across the air/fiber interface. Also, the individual optical fibers 72 preferably consist of a silicone-based material, such as glass, for optical efficiency and temperature compatibility.

Turning now to FIG. 3, an exemplary light emitter 38 is shown in greater detail. A fiber optic sub-bundle 30 extends to an emitter 38 preferably located at a position along the periphery of the aircraft 10, such as on a leading or trailing edge 34, 36. The emitter 38 is secured to the aircraft structure 78 such that it is held securely in place. In the example shown, the emitter 38 is secured to the interior of a wing 14.

Preferably, the emitter 38 is disposed adjacent a transparent cover 80 which forms a part of the aircraft structure 78 and permits transmission of light therethrough. A plurality of individual optical fibers 72 diverge from the fiber optic sub-bundle 30 and extend to the emitter 38. A distal end 76 of each individual optical fiber 72 is secured to a distinct location 84 of the emitter 38 and serves as a light emitting portion of each optical fiber 72. It should be noted that the filter 42 can also be disposed on the transparent outer cover 80 to provide a colored light output.

As best seen in FIG. 4, the distal ends 76 of the individual optical fibers 72 extend to an interior portion 86 of the emitter 38. Preferably, this is accomplished by providing a plurality of openings 88 in distinct locations 84 through an outer surface 90 of the emitter 38. The emitter 38 is preferably spherically or cylindrically shaped for providing a radiant exitance with a Lambertian or diffused profile. Furthermore, the emitter 38 can be solid or hollow depending on system requirements.

A reflective coating 92 such as a highly reflective metal or dielectric material is disposed on a rear surface 94 of the emitter 38 to reflect the light delivered from the individual optical fibers 72. The distal end 76 of the individual optical fibers 72 are angled towards the reflective surface 92 to maximize light collection and for providing uniform output distribution. The forward sector 96 of the emitter 38 is transparent and forms the light emitting aperture of the emitter 38.

Figure 5:
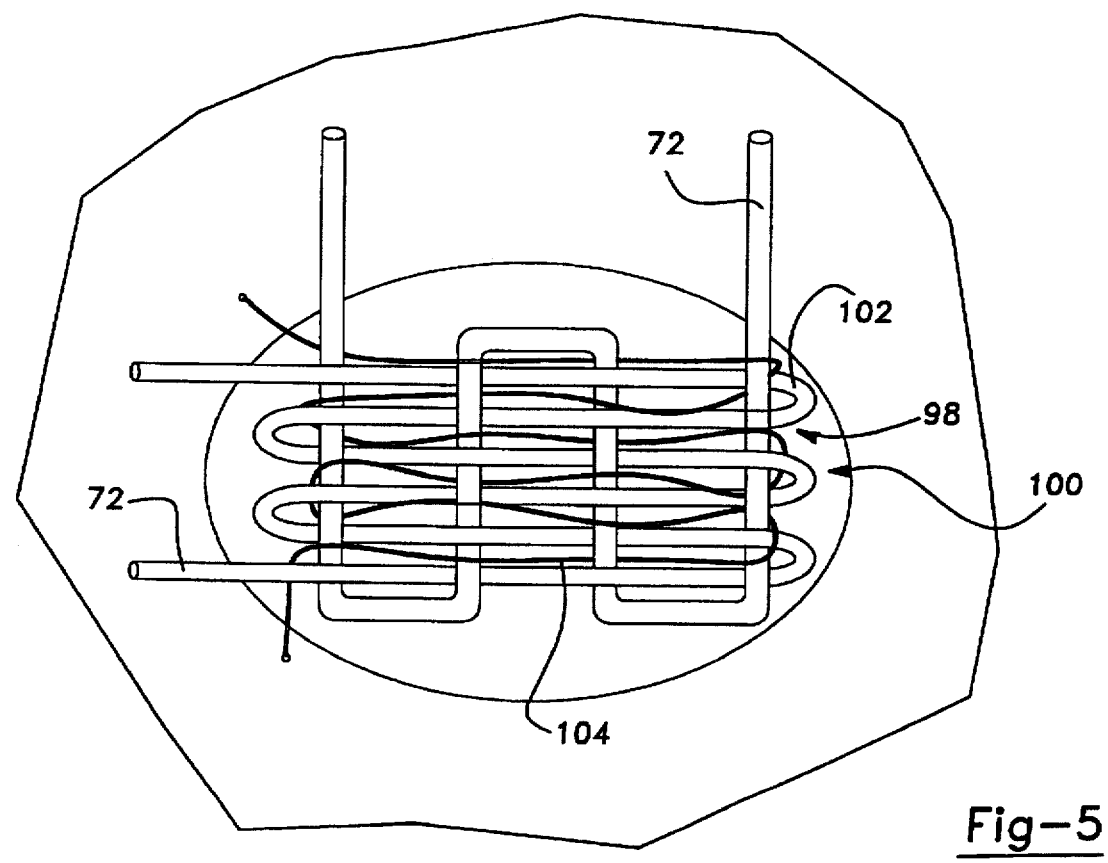
FIG. 5 is a rear view of an emitter according to a second embodiment of the present invention.

Turning now to FIG. 5, an alternate embodiment of a light emitter according to the present invention is shown. In this embodiment the design takes advantage of the individual optical fibers 72 themselves for light emission at the plurality of light emitting locations 32 along the periphery of the aircraft 10. Rather than employing a spherical or cylindrical emitter 38, the individual optical fibers 72 are woven together to form a woven mat 98.

In this case, the fibers 72 are designed so that light energy propagates along the interior of each fiber 72 with little or no light leakage outboard when the fibers 72 are straight due to the dielectric coating 100 on each fiber 72. Such total internal reflection occurs as long as the angle of incidence is greater than the critical angle for the indices of refraction for the fibers 72 and coating 100. However, the light is no longer internally reflected at the fiber wall 102 when the angle of incidence approaches normal incidence. This angle of incidence occurs, for instance, when the fiber 72 is bent, such as in the woven mat 98.

The amount of light radiated from the woven mat 98 can be increased by removing predetermined portions of the dielectric coating 100 from the fibers 72 comprising the woven mat 98 to create a light emitting aperture. Preferably, a graphite fiber 104 is integrated into the woven mat 98 and is used to secure the woven mat 98 to the aircraft structure 78. As with the emitter 38, the woven mat 98 is preferably disposed adjacent a transparent cover 80 which permits transmission of light to the exterior of the aircraft 10. However, with the woven mat 98, the individual optical fibers 72 can be woven together to form a first woven mat 98 and then may be extended, as a sub-bundle 30, to another light emitting location 32 where a second woven mat 98 may be formed. This sequence can be repeated such that a plurality of woven mats 98 can be formed from the same set of individual optical fibers 72 comprising a single sub-bundle 30.

In operation, the aircraft power and control system 48 is operated to activate the centralized light source 24 and to cause the high-intensity halogen light source 44 to generate light. The light generated by the halogen light source 44 is reflected from the highly reflective coating 66 disposed on the interior surface 64 of the concentrator 52 towards an exit end 62. The light is received within the fiber optic bundle 26 through each polished proximal end 74 of the individual glass fibers 72.

The light is directed through the individual glass fibers 72 from the fiber optic bundle 26 to a plurality of fiber optic sub-bundles 30 diverging therefrom. The fiber optic sub-bundles 30 extend towards a plurality of light emitters 38 disposed at a plurality of light output locations 32 positioned along the periphery of the aircraft 10. Preferably, the light emitting locations 32 are positioned at remote locations such as the leading and trailing edges 34, 36 of the wings 14, elevators 18, and rudder 22.

The individual optical fibers 72 diverge from each fiber optic sub-bundle 30 and are secured to distinct locations 84 of an emitter 38 or woven mat 98. In the case of an emitter 38, the light exits from a distal end 76 of each individual optical fiber 72 and is directed towards a highly-reflective coating 92 disposed on a surface 94 of the emitter 38. The light is collected by the reflective surface 92 and is uniformly distributed through a transparent sector 96 of the emitter 38 defining a light emitting aperture. In the case of a woven mat 98, the light exits from predetermined portions of the individual optical fibers 72. Such portions are generally located at positions where the dielectric coating 100 has been removed from the fibers 72 or where the angle of incidence within the fibers 72 approaches normal due to a bend in the fiber 72.

The light passes from the emitter 38 or woven mat 98 through an outer cover 80 which forms a part of the aircraft structure 78. The outer cover 80 may be fitted with a filter 42 for providing colored light output. Accordingly, light is projected outboard of the aircraft 10 from the leading and trailing edges 34, 36.

Therefore, the present invention delivers light generated by a centralized light source via fiber optic lines to the plurality of emitters. From the emitters, the light is directed outboard of the aircraft structure. The present invention eliminates conventional filament-type bulbs from remote locations and reduces the required number of maintenance hours dedicated to replacing bulbs which frequently fail under high vibration. The present invention also reduces the required electrical wiring for operating a light system to a single system directed to a centralized location which reduces the risk of fire. Also, the spheroidal or cylindrical emitter reliably provides a radiant exitance with a Lambertian profile under significant vibration without requiring frequent replacement or service.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A lighting system comprising:
    a light source within an aircraft having a plurality of wings;
    a concentrator operably coupled to said light source for directing light generated therefrom towards an exit end of said concentrator;
    a fiber optic bundle having a proximal end secured to said exit end for receiving said light therein;
    a plurality of sub-bundles diverging from said fiber optic bundle for transporting said light to a plurality of locations; and
    a plurality of emitters operably coupled to said plurality of sub-bundles to receive said light, said emitters being disposed about a periphery of said aircraft.

2. The system of claim 1 wherein said light source further comprises a high intensity halogen light generator.

3. The apparatus of claim 1 wherein said concentrator further comprises:
    a generally cylindrical body portion coupled to said light source at a closed end;
    a conical portion extending from said body portion toward said exit end; and
    a reflective coating disposed on an inner surface of said generally cylindrical body portion and said conical portion.

4. The apparatus of claim 3 wherein said reflective coating comprises a highly reflective metal.

5. The apparatus of claim 3 wherein said reflective coating comprises a dielectric material.

6. The apparatus of claim 1 wherein said fiber optic bundle comprises a plurality of individual fibers.

7. The system of claim 1 wherein said fiber optic bundle comprises a plurality of individual fibers having polished ends.

8. The system of claim 1 wherein said plurality of sub-bundles further comprise:
    a plurality of individual fibers having a proximal end being secured to said concentrator at said exit end; and
    a light emitting portion positioned at said emitter.

9. The system of claim 8 wherein each of said light emitting portions is secured to a distinct location on said emitter.

10. The system of claim 9 wherein each of said plurality of fibers is secured to said emitter such that said light emitting portion angles towards said reflective coating on a surface of said emitter.

11. The system of claim 8 wherein each of said light emitting portions is woven together to form a woven mat.

12. The system of claim 1 wherein said emitter further comprises a reflective coating disposed on a surface thereof.

13. The system of claim 12 wherein said reflective coating comprises a highly reflective metal.

14. The system of claim 12 wherein said reflective coating comprises a dielectric material.

15. The system of claim 1 wherein said emitter further comprises a transparent section defining a light emitting aperture.

16. The system of claim 1 further comprising a colored filter disposed on said emitter for providing a colored light emission.

17. The system of claim 1 further comprising an aircraft power and control system operably coupled to said light source for activating a light generator therein.

18. A lighting system for an aircraft comprising:
    a high intensity halogen light generator disposed within said aircraft;
    a housing including a generally cylindrical portion coupled at a closed end to said light generator;
    a conical portion of said housing extending from said cylindrical portion toward an exit end thereof;
    an inner surface of said housing having a reflective coating disposed thereon;

a fiber optic bundle having a proximal end secured to said exit end of said housing;

a plurality of sub-bundles diverging from a fiber optic bundle toward said plurality of light emitters;

a plurality of individual fibers diverging from said plurality of sub-bundles to a plurality of light emitters disposed about a periphery of said aircraft; and said light emitters having a highly reflective coating disposed on a surface thereof and a transparent portion defining a light emitting aperture.

19. The system of claim 18 wherein said fibers include polished proximal ends secured to said exit end and polished distal ends secured to distinct locations on said plurality of light emitters such that said distal ends angle towards said reflective coating.

20. The system of claim 18 wherein said plurality of light emitters comprise said plurality of individual fibers woven together such that light propagating through said fibers passes through said transparent portion.

21. The system of claim 18 wherein said plurality of light emitters are disposed about said periphery of said aircraft such that light emitted therefrom is directed outboard of said aircraft.

22. The system of claim 21 wherein said plurality of light emitters are disposed at a plurality of leading and trailing edges of said aircraft adjacent transparent covers such that light emitted from said light emitters passes through said transparent covers and projects outboard of said aircraft.

23. The system of claim 1 wherein said emitters are disposed adjacent an edge on at least one of said aircraft wings.

* * * * *